United States Patent
Conner

(10) Patent No.: US 6,552,269 B1
(45) Date of Patent: Apr. 22, 2003

(54) ELECTRICAL OUTLET COVER

(76) Inventor: Patricia Conner, 1 Easton End, Laindon, Basildon, Essex SS15 6QB (GB)

( * ) Notice: Subject to any disclaimer, the term of this patent is extended or adjusted under 35 U.S.C. 154(b) by 0 days.

(21) Appl. No.: 09/855,214

(22) Filed: May 14, 2001

Related U.S. Application Data

(63) Continuation-in-part of application No. 09/595,474, filed on Jun. 16, 2000.

(51) Int. Cl.[7] ................................................ H02G 3/14
(52) U.S. Cl. ..................... 174/67; 174/66; 220/241; 220/242; 439/135
(58) Field of Search ............................. 174/66, 67, 50, 174/58, 63, 53; 312/328; 439/373, 142, 367, 135, 136; 220/241, 242, 4.02, 3.8; D13/177; D8/353

(56) References Cited

U.S. PATENT DOCUMENTS

| | | | | |
|---|---|---|---|---|
| 2,916,733 A | * | 12/1959 | Hirsch | ........................ 174/67 X |
| 4,851,612 A | | 7/1989 | Peckham | |
| 4,915,638 A | * | 4/1990 | Domian | ........................ 439/142 |
| 4,950,842 A | | 8/1990 | Menninga | |
| 5,045,640 A | | 9/1991 | Riceman | |
| 5,195,901 A | | 3/1993 | Correnti | |
| 5,218,169 A | * | 6/1993 | Riceman | ........................ 174/67 |
| D342,235 S | | 12/1993 | Shotey | |
| 5,342,995 A | * | 8/1994 | Comerci et al. | ............... 174/67 |
| 5,389,740 A | | 2/1995 | Austin | |
| 5,703,329 A | * | 12/1997 | Delone | ........................ 174/67 |
| 6,198,045 B1 | * | 3/2001 | Roesch | ........................ 174/58 |
| 6,204,447 B1 | * | 3/2001 | Gretz | ........................... 174/50 |

* cited by examiner

*Primary Examiner*—Dean A. Reichard
*Assistant Examiner*—Dhiru R Patel

(57) ABSTRACT

An electrical outlet cover system for preventing children from playing with the electrical outlets. The electrical outlet cover system includes a mounting frame forming a perimeter wall and defining a central opening for receiving the electrical outlet. The mounting frame has an upper extent, a lower extent, and a pair of side extents extending between the upper and lower extents, and a front face and a rear face for mounting adjacent to the electrical outlet housing. A pair of securing apertures is formed on the mounting frame. A cover member is removably fastenable to the mounting frame over the central opening. The cover member has a front, a back, a top, a bottom, and a pair of sides extending between the top and bottom. A pair of securing members extends rearwardly from the cover member for releasably fastening the cover member to the mounting frame. Each of the securing members extends backwardly from the back of the cover member for inserting into the securing apertures of the mounting frame.

18 Claims, 5 Drawing Sheets

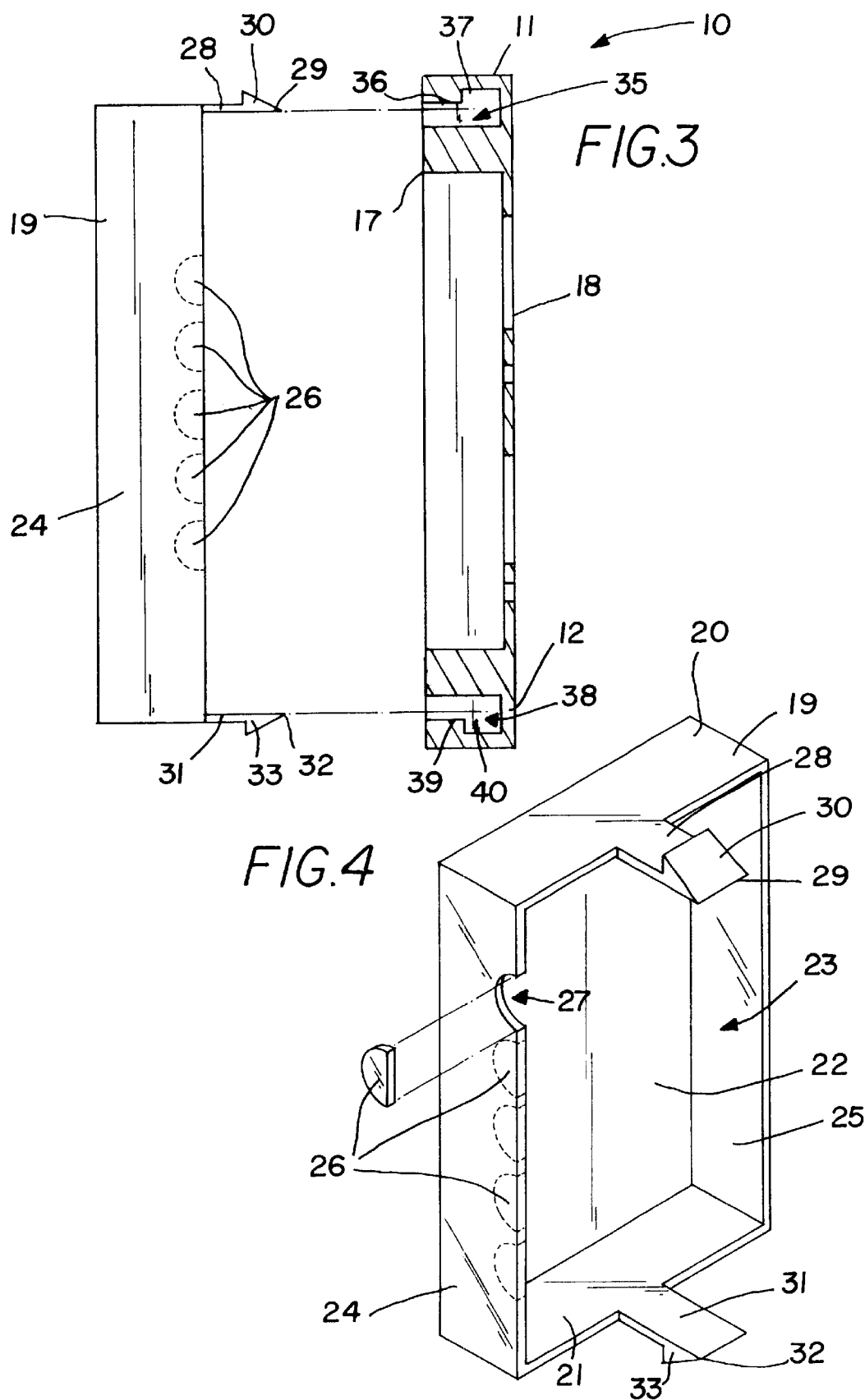

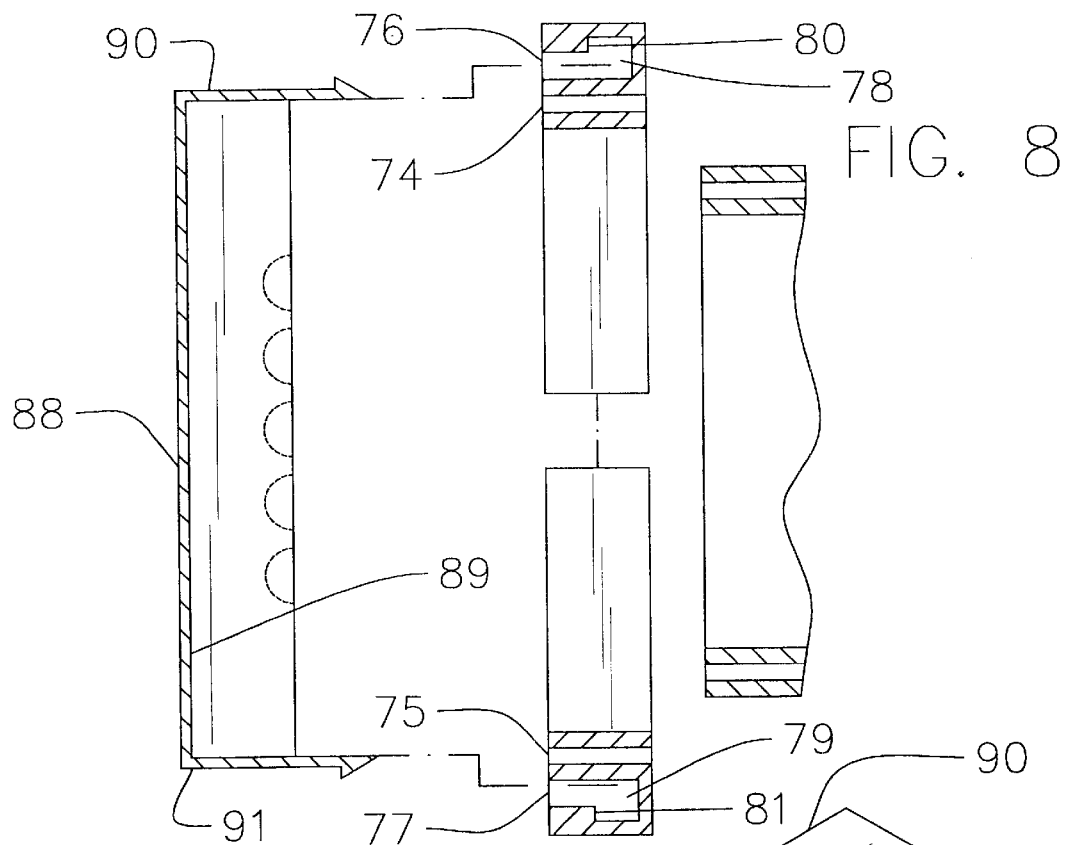
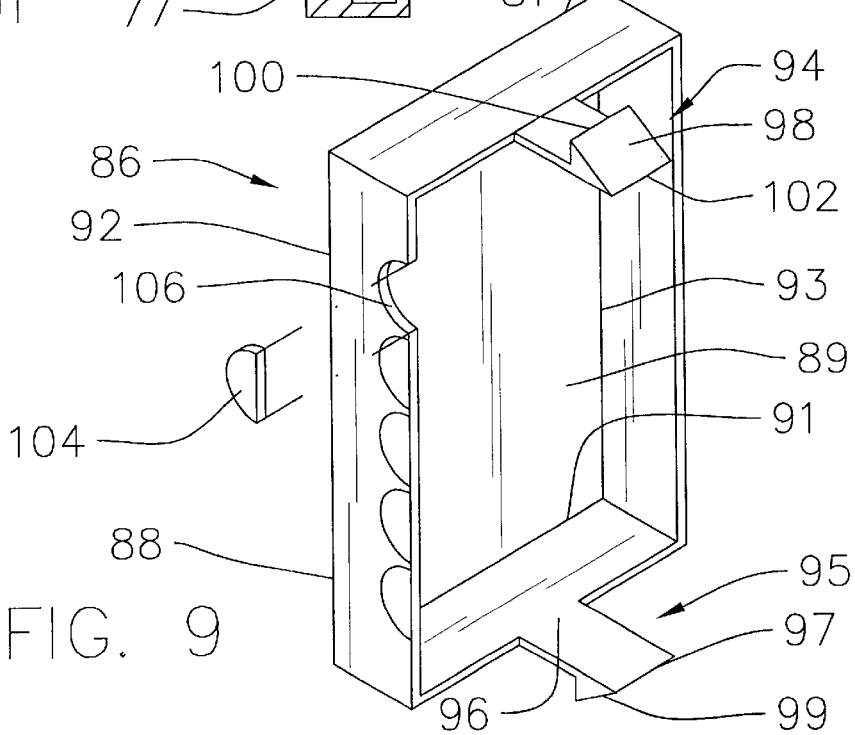

ELECTRICAL OUTLET COVER

REFERENCE TO RELATED APPLICATION

This application is a continuation-in-part of application Ser. No. 09/595,474, filed Jun. 16, 2000.

BACKGROUND OF THE INVENTION

1. Field of the Invention

The present invention relates to a safety cover for electrical outlets and more particularly pertains to a new electrical outlet cover for preventing children from playing with the electrical outlets.

2. Description of the Prior Art

The use of safety cover for electrical outlets is known in the prior art. More specifically, safety cover for electrical outlets heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,703,329; U.S. Pat. No. 5,389,740; U.S. Pat. No. 5,195,901; U.S. Pat. No. 5,045,640; U.S. Pat. No. 4,950,842; and U.S. Pat. No. Des. 342,235.

While these devices fulfill their respective, particular objectives and requirements, the aforementioned patents do not disclose a new electrical outlet cover. The inventive device includes a mounting frame forming a perimeter wall and defining a central opening for receiving the electrical outlet. The mounting frame has an upper extent, a lower extent, and a pair of side extents extending between the upper and lower extents, and a front face and a rear face for mounting adjacent to the electrical outlet housing. A pair of securing apertures is formed on the mounting frame. A cover member is removably fastenable to the mounting frame over the central opening. The cover member has a front, a back, a top, a bottom, and a pair of sides extending between the top and bottom. A pair of securing members extends rearwardly from the cover member for releasably fastening the cover member to the mounting frame. Each of the securing members extends backwardly from the back of the cover member for inserting into the securing apertures of the mounting frame.

In these respects, the electrical outlet cover according to the present invention substantially departs from the conventional concepts and designs of the prior art, and in so doing provides an apparatus primarily developed for the purpose of preventing children from playing with the electrical outlets.

SUMMARY OF THE INVENTION

In view of the foregoing disadvantages inherent in the known types of safety cover for electrical outlets now present in the prior art, the present invention provides a new electrical outlet cover construction wherein the same can be utilized for preventing children from playing with the electrical outlets.

The general purpose of the present invention, which will be described subsequently in greater detail, is to provide a new electrical outlet cover which has many of the advantages of the safety cover for electrical outlets mentioned heretofore and many novel features that result in a new electrical outlet cover which is not anticipated, rendered obvious, suggested, or even implied by any of the prior art safety cover for electrical outlets, either alone or in any combination thereof.

To attain this, the present invention generally comprises a mounting frame forming a perimeter wall and defining a central opening for receiving the electrical outlet. The mounting frame has an upper extent, a lower extent, and a pair of side extents extending between the upper and lower extents, and a front face and a rear face for mounting adjacent to the electrical outlet housing. A pair of securing apertures is formed on the mounting frame. A cover member is removably fastenable to the mounting frame over the central opening. The cover member has a front, a back, a top, a bottom, and a pair of sides extending between the top and bottom. A pair of securing members extends rearwardly from the cover member for releasably fastening the cover member to the mounting frame. Each of the securing members extends backwardly from the back of the cover member for inserting into the securing apertures of the mounting frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new electrical outlet cover which has many of the advantages of the safety cover for electrical outlets mentioned heretofore and many novel features that result in a new electrical outlet cover which is not anticipated, rendered obvious, suggested, or even implied by any of the prior art safety cover for electrical outlets, either alone or in any combination thereof.

It is another object of the present invention to provide a new electrical outlet cover which may be easily and efficiently manufactured and marketed.

It is a further object of the present invention to provide a new electrical outlet cover which is of a durable and reliable construction.

An even further object of the present invention is to provide a new electrical outlet cover which is susceptible of a low cost of manufacture with regard to both materials and labor, and which accordingly is then susceptible of low prices of sale to the consuming public, thereby making such electrical outlet cover economically available to the buying public.

Still yet another object of the present invention is to provide a new electrical outlet cover which provides in the apparatuses and methods of the prior art some of the advantages thereof, while simultaneously overcoming some of the disadvantages normally associated therewith.

Still another object of the present invention is to provide a new electrical outlet cover for preventing children from playing with the electrical outlets.

Yet another object of the present invention is to provide a new electrical outlet cover which includes a mounting frame forming a perimeter wall and defining a central opening for receiving the electrical outlet. The mounting frame has an upper extent, a lower extent, and a pair of side extents extending between the upper and lower extents, and a front face and a rear face for mounting adjacent to the electrical outlet housing. A pair of securing apertures is formed on the mounting frame. A cover member is removably fastenable to the mounting frame over the central opening. The cover member has a front, a back, a top, a bottom, and a pair of sides extending between the top and bottom. A pair of securing members extends rearwardly from the cover member for releasably fastening the cover member to the mounting frame. Each of the securing members extends backwardly from the back of the cover member for inserting into the securing apertures of the mounting frame.

Still yet another object of the present invention is to provide a new electrical outlet cover that prevents children from gaining access to electrical outlets.

Even still another object of the present invention is to provide a new electrical outlet cover that prevents children from being electrocuted.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic exploded side elevational view of the present invention.

FIG. 4 is a schematic rear perspective view of cover member of the present invention.

FIG. 8 is a schematic sectional view of the present invention taken along line 8—8 of FIG. 6.

FIG. 9 is a schematic perspective view of the cover member shown in FIG. 5.

DESCRIPTION OF THE PREFERRED EMBODIMENTS

Figure 1:
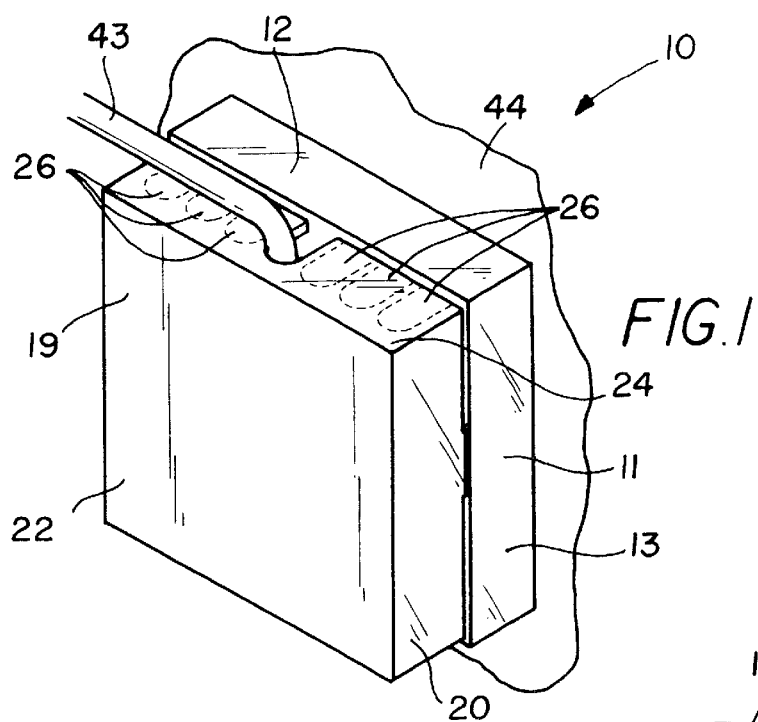
FIG. 1 is a schematic perspective view of a new electrical outlet cover according to the present invention suitable for use with European style electrical outlets.
Figure 2:
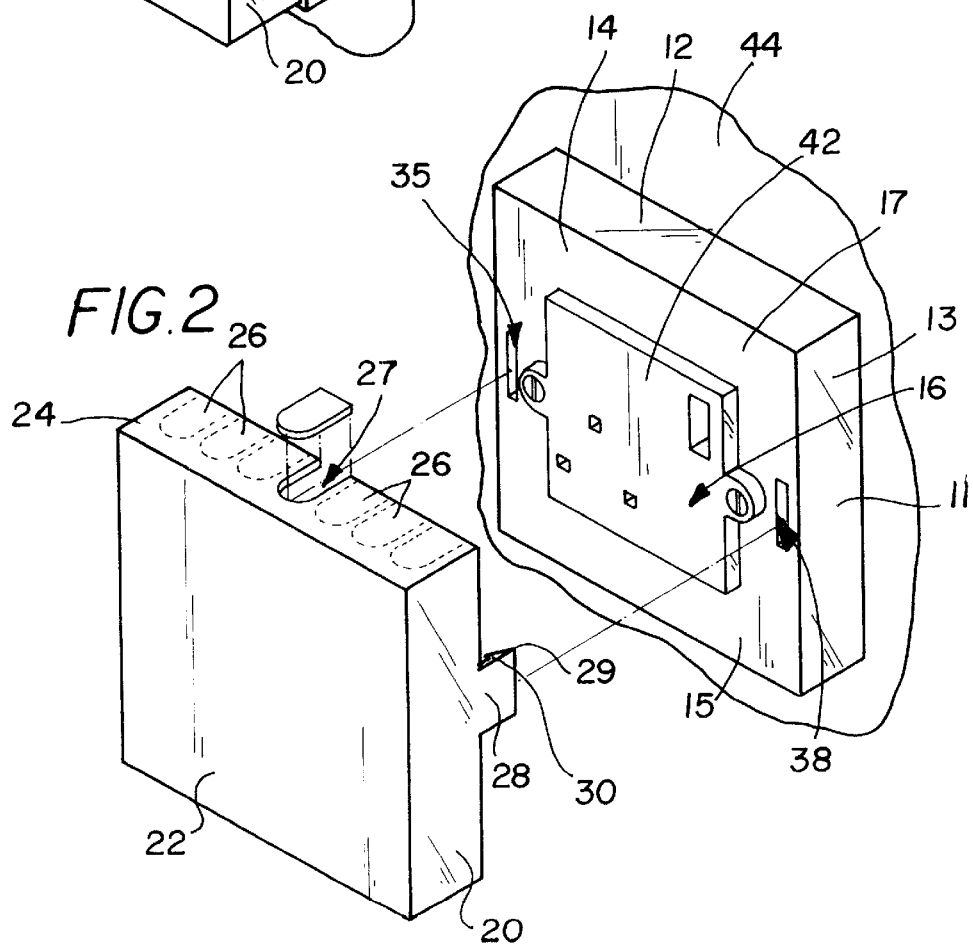
FIG. 2 is a schematic exploded perspective view of the present invention.
Figure 5:
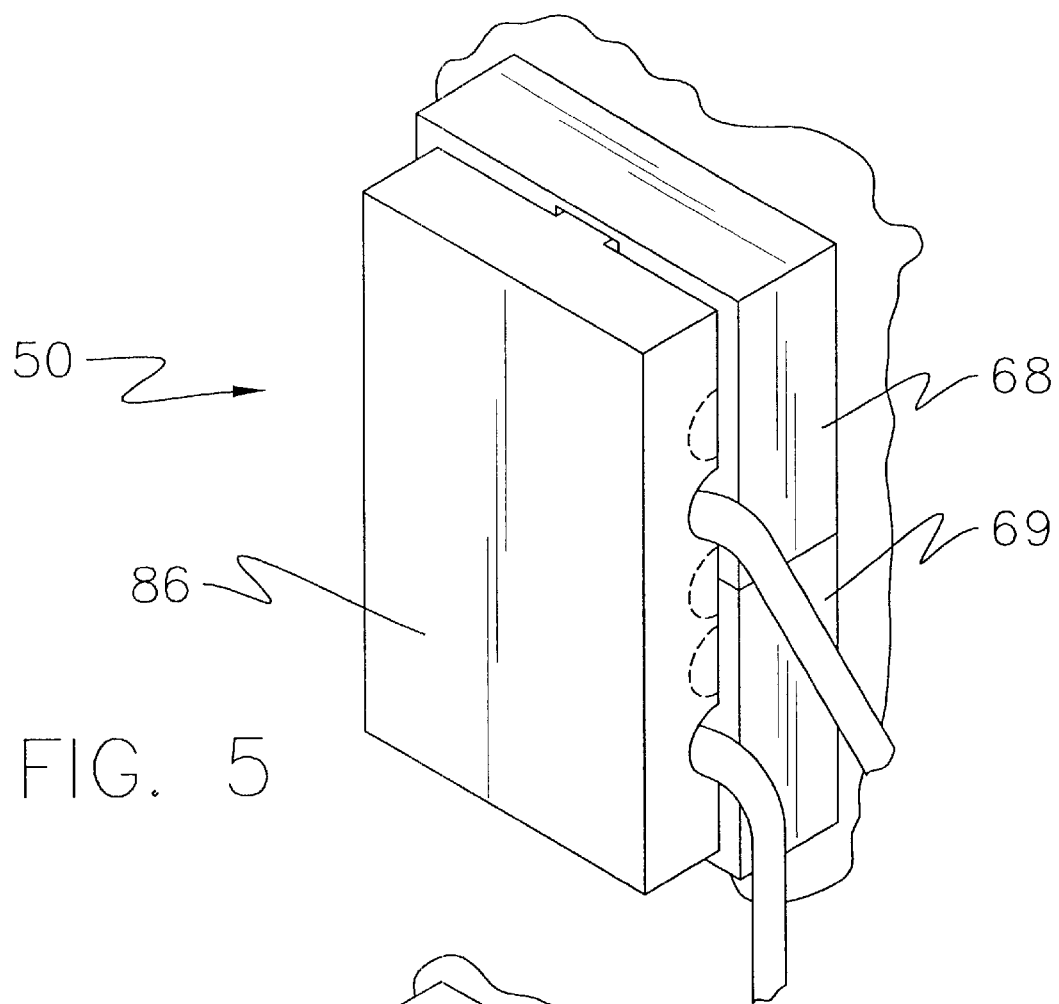
FIG. 5 is a schematic perspective view of a variation of the present invention suitable for use with U.S. style electrical outlets.
Figure 6:
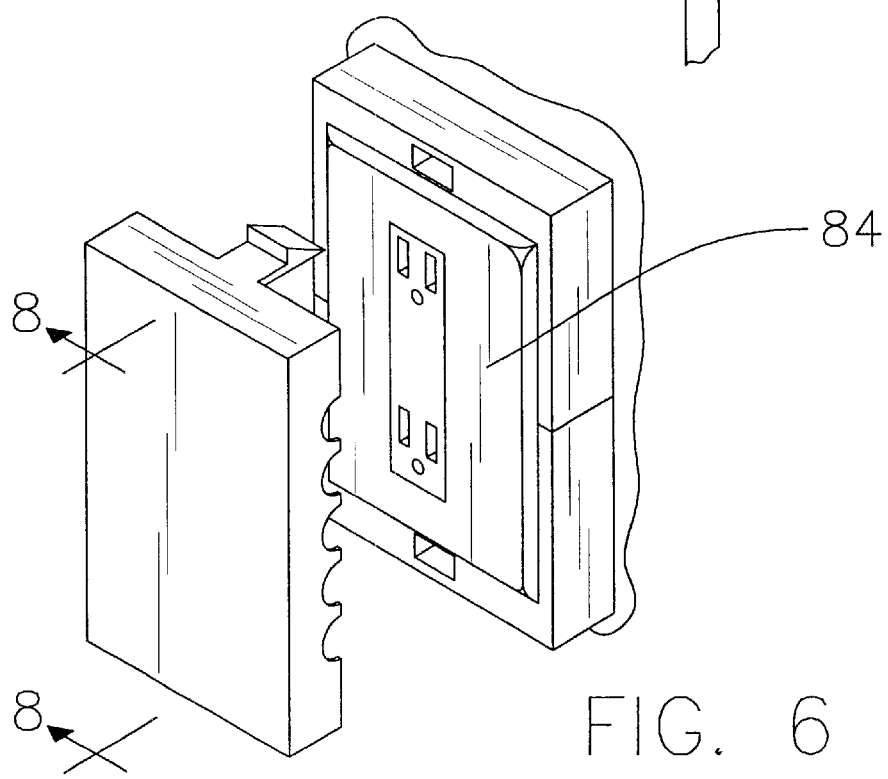
FIG. 6 is a schematic exploded perspective view of the variation of the present invention shown in FIG. 5.

With reference now to the drawings, and in particular to FIGS. 1 through 10 thereof, a new electrical outlet cover embodying the principles and concepts of the present invention and generally designated by the reference numeral 10 will be described.

As best illustrated in FIGS. 1 through 4, the electrical outlet cover 10 generally comprises a faceplate member 11 including a frame 12 having a border 13 which has a definite thickness, a top 14, a bottom 15, a front side 17 and a back side 18. The frame 12 also has an opening 16 extending therethrough from the front side 17 to the back side 18. The faceplate member 11 is adapted to be securely fastened to a wall structure 44 about an electrical outlet 42 with the electrical outlet 42 being exposed in the opening 16 of the frame 12. The faceplate member 11 includes a plurality of bores 35, 38 extending in the border 13, one of which extends in the front side 17 near the top 14 of the border 13 and terminates near the back side 18, and another of which extends in the front side 17 near the bottom 15 of the border 13 and terminates near the back side 18. The faceplate member 11 includes walls 36, 39 forming the bores 35, 38, one of the walls 36, 39 in each of the bores 35, 38 having a recessed rear portion 37, 40. A cover member 19 having a front wall 22, a top wall 20, a bottom wall 21, and first and second side walls 24, 25 and an open back 23 is removably attached to the faceplate member 11 over the opening 16. The cover member 19 includes a plurality of notch capable members 26 disposed and spaced along a rear edge of the first side wall 24; wherein, each of the notch capable members 26 can be formed into a respective notch 27 which is adapted to receive a power cord 43 therethrough when the cover member 19 is removably fastened to the faceplate member 11. A plurality of fastening members 28, 31 are integrally attached to and extend rearwardly from the cover member 19 for removably fastening the cover member 19 to the faceplate member 11 with one of the fastening members 28 extending from an edge of the top wall 20 of the cover member 19 and with another of the fastening members 31 extending from an edge of the bottom wall 21 of the cover member 19. Each of the fastening members 28, 31 includes an elongate member having a free end 29, 32 and a raised and tapered end portion 30, 33 which is adapted to be removably received in a respective one of the bores 35, 38 for fastening the cover member 19 to the faceplate member 11. Each of the raised and tapered end portions 30, 33 is tapered toward the free end 29, 32 of a respective one of the fastening members 28, 31 and is removably received in the recessed portion 37, 40 of a respective one of the bores 35, 38 for fastening the cover member 19 to the faceplate member 11 over the opening 16 thereof.

In use, the user fastens the faceplate member 11 to a wall structure 44 with screws, and after having plugged in the selected power cords 43 into the electrical outlet 42, the user places the back 23 of the cover member 19 over the opening 16 of the faceplate member 11 and places the power cords 43 in the notches 27 which are formed in the notch capable members 26 and then removably fastens the cover member 19 to the faceplate member 11 by inserting the fastening members 28, 31 into the bores 35, 38 in the front side 17 of the border 13 of the faceplate member 11.

A variation of the invention is highly suitable for use with electrical outlets typically used in the United States, as shown in FIGS. 5 through 9 of the drawings. The electrical outlet safety system 50 is mountable on an electrical outlet housing having a perimeter edge positioned adjacent to an opening in a wall.

An electrical outlet 52 may be provided for coupling to the electrical outlet housing, and may have a pair of oppositely extending mounting ears 54, 55. Each of the mounting ears 54, 55 may have a mounting hole 56, 57 formed therein for receiving a fastener that extends into threadable passages formed in the electrical outlet housing.

The system of the invention includes a mounting frame 58 that forms a perimeter wall and defines a central opening 60 for receiving the electrical outlet 52. The mounting frame has an upper extent 62, a lower extent 63, and a pair of side extents 64, 65 that extend between the upper and lower extents. The mounting frame has a front face 66 and a rear face (not shown) for positioning adjacent to the electrical outlet housing. In one highly preferred embodiment of the invention, the mounting frame 58 comprises a pair of opposing frame portions 68, 69. Each of the frame portions may generally comprise approximately one-half of the mounting frame. An upper one 68 of the frame portions may comprise the upper extent 62 and an upper portion of each of the side extents 64, 65, and a lower one 69 of the frame portions may comprise the lower extent 63 and a lower portion of each of the side extents. Each of the frame portions may have a pair of free ends 70, 71, 72, and 73 on the portions of the side extents.

A pair of mounting apertures 74, 75 is formed on the mounting frame for receiving the fastener passing through the mounting holes 56, 57 on the electrical outlet for mounting the mounting frame on the electrical outlet housing. Each of the mounting apertures may be located at substantially opposite locations on the mounting frame, and an upper one 74 of the mounting apertures is located on the upper extent of the mounting frame and a lower one 75 of the mounting apertures being located on the lower extent of the mounting frame.

The mounting frame includes a pair of securing apertures 76, 77 formed on the mounting frame for mounting the cover member on the mounting frame. Each of the securing apertures may be located at substantially opposite locations on the mounting frame, and an upper one 76 of the securing apertures may be located on the upper extent 62 of the mounting frame and a lower one 77 of the securing apertures being located on the lower extent 63 of the mounting frame. Each of the securing apertures is in communication with a securing cavity 78, 79. Each of the securing cavities extends into the mounting frame from the front face 66 toward the rear face. Each of the securing cavities may have a securing shoulder 80, 81 formed therein. Illustratively, the upper securing aperture may be located adjacent to the upper mounting aperture and the lower securing aperture may be located adjacent to the lower mounting aperture.

Figure 10:
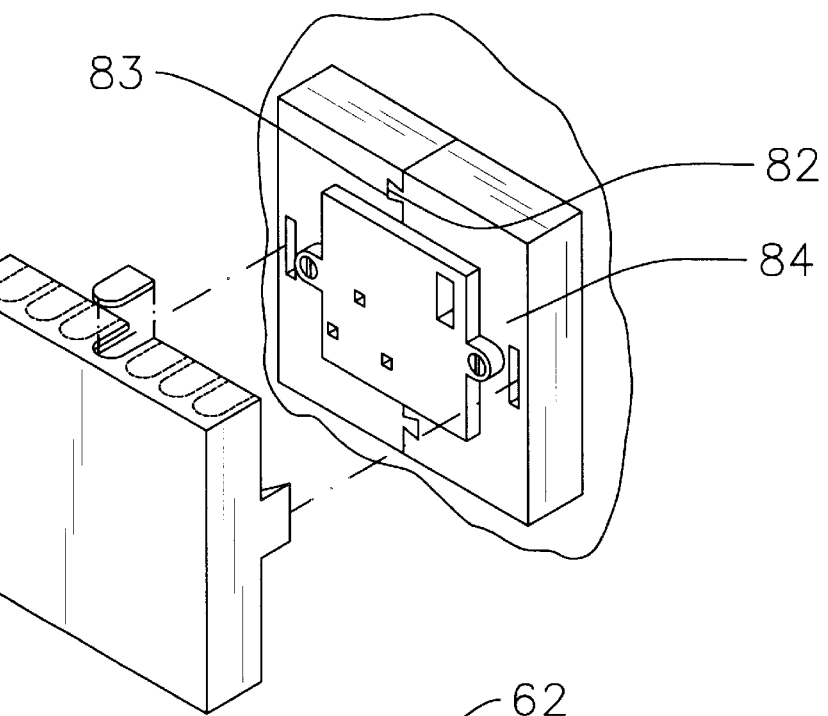
FIG. 10 is a schematic perspective of another variation of the present invention.
Figure 7:
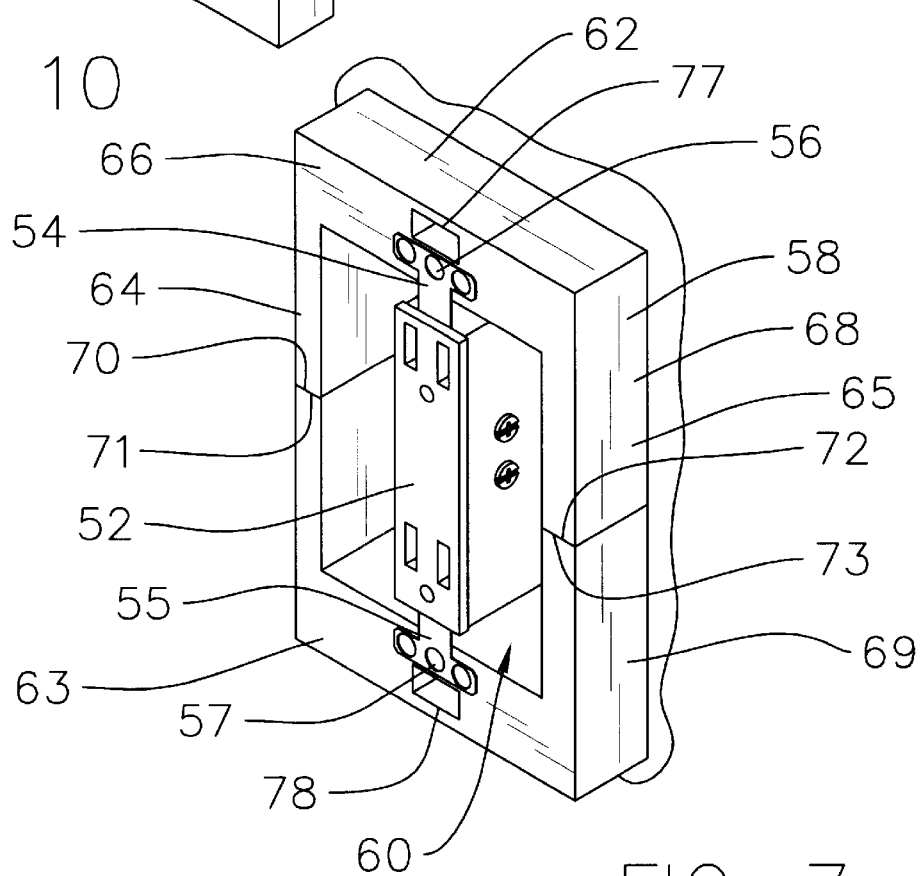
FIG. 7 is a schematic perspective view of the frame of the variation of FIG. 5 with the face plate removed.

In a highly preferred embodiment of the invention, the mounting frame includes mounting means for releasably mounting the free ends of one of the frame portions to the free-ends of the other of the frame portions. The mounting means may comprise a dovetail protrusion 82 formed on one of the free ends of the frame portion and a complementary dovetail cavity 83 formed on another of the free ends of the frame portion for permitting removable insertion of the dovetail protrusion into the dovetail cavity. The mounting means is shown in FIG. 10 of the drawings in connection with a European style outlet, but it should be understood that the mounting means may be readily adapted to the United States style outlet system shown in FIGS. 5 through 9. While the fastener that extends from the electrical outlet through the mounting frame and into the electrical outlet housing secures the frame portions in position with respect to the housing and the outlet, the mounting means may provide an additional means of securing the frame portions in position.

A faceplate 84 may be provided that is mountable on the electrical outlet in a manner such that the faceplate covers the central opening of the frame and portions of the electrical outlet not suitable for viewing or layperson access. The faceplate may comprise a conventional faceplate used in conjunction with a conventional electrical outlet, and which typically is screw fastened to the electrical outlet.

The system of the invention also includes a cover member 86 which is removably fastenable to the mounting frame over the central opening. The cover member has a front 88, a back 89, a top 90, a bottom 91, and a pair of sides 92, 93 that extend between the top and bottom.

A pair of securing members 94, 95 may extend rearwardly from the cover member for releasably fastening the cover member to the mounting frame. Each of the securing members may extend substantially perpendicular to the back of the cover member for A pair of securing members 94, 95 may extend rearwardly from the cover member for releasably fastening the cover member to the mounting frame. Each of the securing members may extend substantially perpendicular to the back of the cover member for inserting into the securing apertures of the mounting frame. Each of the securing members may comprise an elongate member having a first end 96 that mounted on the cover member and a free end 97 that extends away from the cover member. The free end has a barb structure 98, 99 that is adapted for engaging the securing shoulder 80, 81 in one of the securing cavities for holding the cover member in a position adjacent to the mounting frame. Each of the barb structures has a raised edge 100 on a side of the securing member and tapering toward an end edge 102 at the free end.

In one embodiment of the invention, the cover member may comprise a front wall, a top wall, a bottom wall, and first and second side walls. The top, bottom and side walls may extend backwardly from the front wall to define an open back. The cover member may include a plurality of knockout portions 104 that are disposed and spaced along a rear edge of the first side wall. Each of the knockout portions is removable from the cover member for forming a notch 106 adapted to receive a power cord therethrough when the cover member is removably fastened to the mounting frame.

Significantly, the mounting frame having multiple frame portions permits the invention to be installed on an existing electrical outlet with minimal modification of the existing structure and without having to, for example, disconnect the electrical supply wires from the electrical outlet. Illustratively, one may unscrew the mounting fasteners of the electrical outlet from the housing, pull the outlet outwardly from the housing without removing the supply wires, bring the frame portions together between the electrical outlet housing and the mounting ears of the outlet. The mounting fasteners may them be inserted through the mounting hole of the mounting ear of the outlet, through the mounting apertures on the frame portions, and into the structure of the electrical outlet housing to secure the assembly to the housing, and thereby any wall on which the housing is mounted.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electrical outlet safety system for mounting on an electrical outlet housing having a perimeter edge positioned adjacent to an opening in a wall, the outlet safety system comprising:

a mounting frame forming a perimeter wall and defining a central opening for receiving the electrical outlet, the mounting frame having an upper extent, a lower extent, and a pair of side extents extending between the upper and lower extents, the mounting frame having a front face and a rear face for mounting adjacent to the electrical outlet housing, a pair of securing apertures being formed on the mounting frame; and a cover member removably fastenable to the mounting frame over the central opening, the cover member having a front, a back, a top, a bottom, and a pair of sides extending between the top and bottom, wherein a pair of securing members extend rearwardly from the cover member for releasably fastening the cover member to the mounting frame, each of the securing members extending backwardly from the back of the cover member for inserting into the securing apertures of the mounting frame;

wherein the mounting frame comprises a pair of opposing frame portions and mounting means for releasably mounting the frame portions together.

2. The system of claim 1 wherein each of the securing apertures being located at substantially opposite locations on the mounting frame.

3. The system of claim 1 wherein each of the securing apertures is in communication with a securing cavity, each of the securing cavities extending into the mounting frame from the front face toward the rear face, each of the securing cavities having a securing shoulder formed therein.

4. The system of claim 1 wherein each of the securing members comprises an elongate member having a first end mounted on the cover member and a free end extending away from the cover member.

5. The system of claim 4 wherein each of the securing apertures is in communication with a securing cavity having a securing shoulder formed therein, and wherein the free end of the securing members has a barb structure adapted for engaging the securing shoulder in one of the securing cavities for holding the cover member in a position adjacent to the mounting frame.

6. The system of claim 5 wherein each of the barb structures has a raised edge on a side of the securing member and tapering toward an end edge at the free end.

7. The system of claim 1 wherein the cover member comprises a front wall, a top wall, a bottom wall, and first and second side walls, the top, bottom and side walls extending backwardly from the front wall to define an open back.

8. The system of claim 7 wherein the cover member includes a plurality of knockout portions disposed and spaced along a rear edge of the first side wall, each of the knockout portions being removable from the cover member for forming a notch adapted to receive a power cord therethrough when the cover member is removably fastened to the mounting frame.

9. The system of claim 1 additionally comprising a faceplate mountable on the electrical outlet such that the faceplate covers the central opening of the frame.

10. The system of claim 1 wherein each of the frame portions generally comprising approximately one-half of the mounting frame.

11. The system of claim 1 wherein an upper one of the frame portions comprises the upper extent and a portion of each of the side extents and a lower one of the frame portions comprises the lower extent and a portion of each of the side extents.

12. The system of claim 1 wherein an upper one of the securing apertures is located on the upper extent of the mounting frame and a lower one of the securing apertures is located on the lower extent of the mounting frame.

13. The system of claim 1 wherein a pair of mounting apertures is formed on the mounting frame for receiving a fastener passing through mounting holes on an electrical outlet for mounting the mounting frame on the electrical outlet housing.

14. The system of claim 1 wherein the mounting means are located on free ends of the frame portions for releasably fastening the free ends of the frame portions together.

15. The system of claim 14 wherein the mounting means comprises a dovetail protrusion formed on one of the free ends of the frame portion and a dovetail cavity formed on another of the free ends of the frame portion for permitting removable insertion of the dovetail protrusion into the dovetail cavity.

16. The system of claim 1 additionally comprising an electrical outlet for coupling to an electrical outlet housing, the electrical outlet having a pair of oppositely-extending mounting ears, each of the mounting ears having a mounting hole therein.

17. An electrical outlet safety system for mounting on an electrical outlet housing having a perimeter edge positioned adjacent to an opening in a wall, the outlet safety system comprising:

a mounting frame forming a perimeter wall and defining a central opening for receiving the electrical outlet, the mounting frame having an upper extent, a lower extent, and a pair of side extents extending between the upper and lower extents, the mounting frame having a front face and a rear face for mounting adjacent to the electrical outlet housing, a pair of securing apertures being formed on the mounting frame; and a cover member removably fastenable to the mounting frame over the central opening, the cover member having a front, a back, a top, a bottom, and a pair of sides extending between the top and bottom, wherein a pair of securing members extend rearwardly from the cover member for releasably fastening the cover member to the mounting frame, each of the securing members extending backwardly from the back of the cover member for inserting into the securing apertures of the mounting frame;

wherein the mounting frame comprises a pair of opposing frame portions; and wherein each of the frame portions has a pair of free ends on the frame portions of the side extents.

18. An electrical outlet safety system for mounting on an electrical outlet housing having a perimeter edge positioned adjacent to an opening in a wall, the outlet safety system comprising:

an electrical outlet for coupling to an electrical outlet housing, the electrical outlet having a pair of oppositely-extending mounting ears, each of the mounting ears having a mounting hole therein;

a mounting frame forming a perimeter wall and defining a central opening for receiving the electrical outlet, the mounting frame having an upper extent, a lower extent, and a pair of side extents extending between the upper and lower extents, the mounting frame having a front face and a rear face for mounting adjacent to the electrical outlet housing;

wherein the mounting frame comprises a pair of opposing frame portions, each of the frame portions generally comprising approximately one-half of the mounting frame, an upper one of the frame portions comprising the upper extent and a portion of each of the side extents and a lower one of the frame portions comprising the lower extent and a portion of each of the side extents, each of the frame portions having a pair of free ends on the portions of the side extents;

wherein a pair of mounting apertures is formed on the mounting frame for receiving a fastener passing through the mounting holes on the electrical outlet for mounting the mounting frame on the electrical outlet housing, each of the mounting apertures being located at substantially opposite locations on the mounting frame, an upper one of the mounting apertures being located on the upper extent of the mounting frame and a lower one of the mounting apertures being located on the lower extent of the mounting frame;

wherein a pair of securing apertures are formed on the mounting frame for mounting the cover member on the mounting frame, each of the securing apertures being located at substantially opposite locations on the mounting frame, an upper one of the securing apertures being located on the upper extent of the mounting frame and a lower one of the securing apertures being located on the lower extent of the mounting frame, each of the securing apertures being in communication with a securing cavity, each of the securing cavities extending into the mounting frame from the front face toward the rear face, each of the securing cavities having a securing shoulder formed therein;

wherein the upper securing aperture is located adjacent to the upper mounting aperture and the lower securing aperture is located adjacent to the lower mounting aperture;

wherein the mounting frame includes mounting means for releasably mounting the free ends of one of the frame portions to the free ends of the other of the frame portions, the mounting means comprising a dovetail protrusion formed on one of the free ends of the frame portion and a dovetail cavity formed on another of the free ends of the frame portion for permitting removable insertion of the dovetail protrusion into the dovetail cavity;

a faceplate mountable on the electrical outlet such that the faceplate covers the central opening of the frame;

a cover member removably fastenable to the mounting frame over the central opening, the cover member having a front, a back, a top, a bottom, and a pair of sides extending between the top and bottom;

wherein a pair of securing members extend rearwardly from the cover member for releasably fastening the cover member to the mounting frame, each of the securing members extending substantially perpendicular to the back of the cover member for extending into the securing apertures of the mounting frame, each of the securing members comprising an elongate member having a first end mounted on the cover member and a free end extending away from the cover member, the free end having a barb structure adapted for engaging the securing shoulder in one of the securing cavities for holding the cover member in a position adjacent to the mounting frame, each of the barb structures having a raised edge on a side of the securing member and tapering toward an end edge at the free end;

wherein the cover member comprises a front wall, a top wall, a bottom wall, and first and second side walls, the top, bottom and side walls extending backwardly from the front wall to define an open back;

wherein the cover member includes a plurality of knockout portions disposed and spaced along a rear edge of the first side wall, wherein each of the knockout portions is removable from the cover member for forming a notch adapted to receive a power cord therethrough when the cover member is removably fastened to the mounting frame.

* * * * *